(12) United States Patent
Vasa

(10) Patent No.: US 12,442,859 B1
(45) Date of Patent: Oct. 14, 2025

(54) DIRECTIONAL CONTROL OF SCAN CAPTURE THROUGH SHARED WRAPPER CELLS

(71) Applicant: Google LLC, Mountain View, CA (US)

(72) Inventor: Veerabhadra Rao Vasa, Bengaluru (IN)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/736,001

(22) Filed: Jun. 6, 2024

(51) Int. Cl.
G01R 31/3177 (2006.01)
G01R 31/28 (2006.01)
G01R 31/317 (2006.01)
G01R 31/3185 (2006.01)

(52) U.S. Cl.
CPC ..... *G01R 31/3177* (2013.01); *G01R 31/2815* (2013.01); *G01R 31/31713* (2013.01); *G01R 31/31724* (2013.01); *G01R 31/318533* (2013.01); *G01R 31/318597* (2013.01)

(58) Field of Classification Search
CPC .......... G01R 31/3177; G01R 31/31713; G01R 31/31724; G01R 31/2815; G01R 31/318533; G01R 31/318597
USPC ........................................ 714/726, 727, 729
See application file for complete search history.

(56) References Cited

U.S. PATENT DOCUMENTS

| | | | | |
|---|---|---|---|---|
| 7,653,849 B1 * | 1/2010 | Tabatabaei | ..... | G01R 31/318508 714/733 |
| 8,555,123 B2 * | 10/2013 | Wu | ..... | G06F 11/2236 714/727 |
| 2012/0159251 A1 * | 6/2012 | Wu | ..... | G06F 11/2236 714/E11.171 |
| 2015/0355278 A1 * | 12/2015 | Shetty | ..... | G01R 31/3177 714/729 |
| 2015/0377963 A1 * | 12/2015 | Whetsel | ..... | G01R 31/31713 714/727 |
| 2016/0349320 A1 | 12/2016 | Laisne et al. | | |
| 2023/0366930 A1 * | 11/2023 | Chandra | ..... | G01R 31/318555 |
| 2024/0320409 A1 * | 9/2024 | Makkar | ..... | G01R 31/318513 |

OTHER PUBLICATIONS

Da Silva, et al., "The Core Test Wrapper Handbook", Jan. 2006, 297 pages.
H, et al., "Signal Agnostic Scalable Scan Wrapper Design", Apr. 10, 2023, 6 pages.

* cited by examiner

*Primary Examiner* — John J Tabone, Jr.
(74) *Attorney, Agent, or Firm* — Colby Nipper PLLC

(57) ABSTRACT

Aspects of directional control of scan capture through shared wrapper cells are disclosed. For example, a control circuit of an integrated-circuit IC can enable the directional control of scan captures through a shared wrapper cell. The control circuit can receive a selection of a mode for testing the IC and, based on the selection of the mode, the control circuit configures logic of a shared wrapper cell to control a direction of a scan capture through the shared wrapper cell for the selected test mode. The scan capture for the selected test mode is applied to the shared wrapper cell and an output of the scan capture through the shared wrapper cell is determined for the selected test mode. By so doing, the described aspects may enable fault activation or fault observation for logic that could not be previously tested due to the one-way nature of many test modes.

19 Claims, 9 Drawing Sheets

| Mode Name | In-Test Mode TDR Value | Ex-Test Mode TDR Value | Sync Interface TDR Value |
|---|---|---|---|
| In-test Mode | 1'b1 | 1'b0 | 1'b0 |
| Ex-test Mode | 1'b0 | 1'b1 | 1'b0 |
| Control Circuit Mode | 1'b1 | 1'b0 | 1'b1 |

FIG. 6

| Mode Name | In-Test Mode TDR Value | Ex-Test Mode TDR Value | Sync Interface TDR Value | Scan Enable Value | Input Wrapper Cell Mux Select Value | Output Wrapper Cell Mux Select Value |
|---|---|---|---|---|---|---|
| In-test Mode | 1'b1 | 1'b0 | 1'b0 | 1'b0 | 1'b1 | 1'b0 |
| Ex-test Mode | 1'b0 | 1'b1 | 1'b0 | 1'b0 | 1'b0 | 1'b1 |
| Control Circuit Mode | 1'b1 | 1'b0 | 1'b1 | 1'b0 | 1'b0 | 1'b0 |

FIG. 7

DIRECTIONAL CONTROL OF SCAN CAPTURE THROUGH SHARED WRAPPER CELLS

BACKGROUND

Chip manufacturers test chips during or after manufacturing to verify operation of the chips and screen out defective parts to ensure that chip customers receive viable integrated circuit (IC) chips. This testing may occur at various fabrication and chip production stages, which may include wafer sort testing, package-level testing, system-level testing, and the like. Various hardware components, such as a graphics processing unit or a central processing unit are often partitioned into multiple physical partitions on a system-on-chip (SoC). This is done in an effort to reduce design complexity, improve timing, or shorten the design cycle.

An automatic test pattern generation (ATPG) process is a test used to detect structural faults, such as stuck-at faults or transition delay faults, within the physical partitions or within the logic interfaces between the physical partitions. The ATPG process uses multiple scan phases utilizing core wrappers of the blocks on the SoC. An in-test mode is used to scan and capture data within the blocks and an ex-test mode is used to scan and capture data of the logic interfaces between the blocks. As chip complexity increases, circuit designs may cause wrapper cells to block detection of faults. This can prevent the proper testing of all blocks and interfaces of an IC, such as an SoC.

SUMMARY

This document describes apparatuses, systems, and methods for aspects of directional control of scan capture through shared wrapper cells. For example, a control circuit of an integrated-circuit IC can enable the directional control of scan captures through a shared wrapper cell. The control circuit can receive a selection of a mode for testing the IC and, based on the selection of the mode, the control circuit configures logic of a shared wrapper cell to control a direction of a scan capture through the shared wrapper cell for the selected test mode. The scan capture for the selected test mode is applied to the shared wrapper cell and an output of the scan capture through the shared wrapper cell is determined for the selected test mode. By so doing, the described techniques may enable fault activation or fault observation for logic that could not be previously tested due to the one-way nature of many test modes.

In some aspects, the techniques include an IC with a control circuit that enables the directional control. The IC including an in-test mode TDR, a sync interface TDR, a scan enable pin, and an ex-test mode TDR. The control circuit can include a NOT gate having an input and an output, the input coupled with the sync interface TDR, the control circuit including an OR gate having a first input, a second input, and an output, the first input coupled with the output of the NOT gate and the second input coupled with the scan enable pin. The control circuit also includes a first AND gate having a first input, a second input, and an output, the first input of the first AND gate coupled with the in-test mode TDR and the second input of the first AND gate coupled with the output of the OR gate. The control circuit can include a second AND gate having a first input, a second input, and an output, the first input of the second AND gate coupled with the output of the OR gate and the second input of the second AND gate coupled with the ex-test mode TDR. The IC includes an input shared wrapper cell coupled with the output of the first AND gate and an output shared wrapper cell coupled with the output of the second AND gate.

In other aspects, the techniques are performed by a system, that includes a first block of an SoC and a first shared wrapper operably coupled with the first block, the first shared wrapper including a first input shared wrapper cell and a first output shared wrapper cell. The system can include a first control circuit within the first block. The first control circuit can include a first NOT gate having an input and an output, the input coupled with a first sync interface TDR. The first control circuit can include a first OR gate having a first input, a second input, and an output, the first input coupled with the output of the first NOT gate and the second input coupled with a first scan enable pin. The first control circuit can include a first AND gate having a first input, a second input, and an output, the first input of the first AND gate coupled with a first in-test mode TDR and the second input of the first AND gate coupled with the output of the first OR gate. The first control circuit can include a second AND gate having a first input, a second input, and an output, the first input of the second AND gate coupled with the output of the first OR gate and the second input of the second AND gate coupled with a first ex-test mode TDR.

In yet other aspects, the techniques described herein relate to a method for testing an IC, in which a selection of a mode for testing the IC is received. The techniques configure logic of a shared wrapper cell to control a direction of a scan capture through the shared wrapper cell for the selected test mode. The techniques apply the scan capture for the selected mode to the shared wrapper cell and determine an output of the scan capture for the shared wrapper cell of the selected test mode.

This Summary is provided to introduce simplified concepts for directional control of scan capture through shared wrapper cells, which are further described below in the Detailed Description and are illustrated in the Drawings. This Summary is not intended to identify essential features of the claimed subject matter, nor is it intended for use in determining the scope of the claimed subject matter.

BRIEF DESCRIPTION OF DRAWINGS

Apparatuses of and techniques for directional control of scan capture through shared wrapper cells are described with reference to the following drawings. The same numbers are used throughout the drawings to reference like features and components.

FIG. 6 illustrates an example chart for an implementation of logic inputs for aspects of direction control of scan capture through shared wrapper cells.

FIG. 7 illustrates an example chart of an implementation of logic inputs for aspects of direction control of scan capture through shared wrapper cells.

DETAILED DESCRIPTION

Overview

Figure 1:
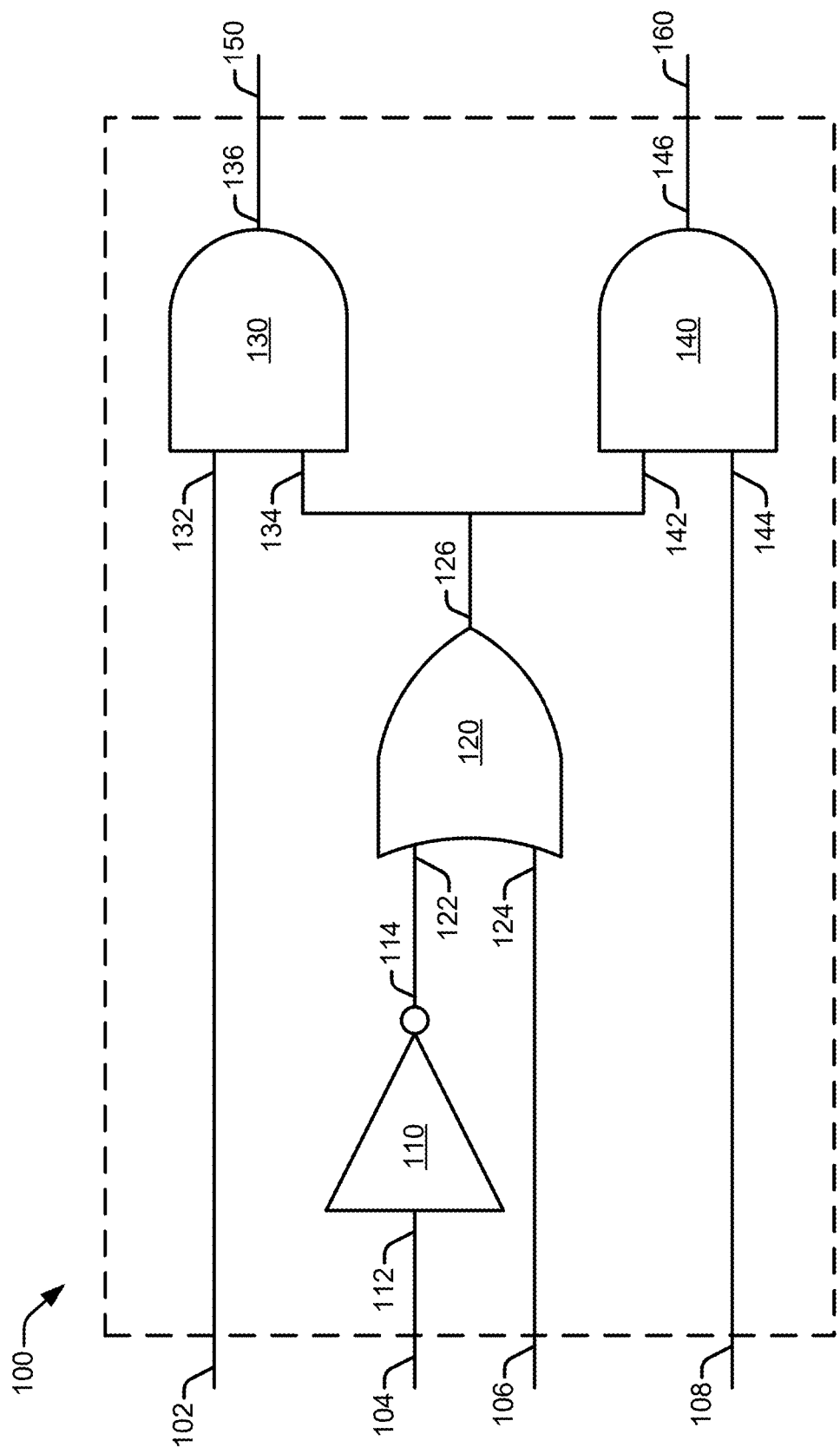
FIG. 1 illustrates an example schematic of a control circuit in which aspects for direction control of scan capture through shared wrapper cells can be implemented.

An automatic test pattern generation (ATPG) process typically utilizes wrapper cells to detect structural faults within one or more blocks of an SoC. Generally, there are two types of wrapper cells, namely, shared wrapped cells and dedication wrapper cells. Further, there are input wrapper cells and output wrapper cells for both shared wrapper cells and dedicated wrapper cells. As used herein, the term "wrapper cell" refers to either an input shared wrapper cell or an output shared wrapper cell. To detect faults within blocks, an in-test mode scan and data capture are performed via input wrapper cells. In an in-test mode, input wrapper cells are used to scan data within a block and output wrapper cells are used to observe the captured data. During an in-test mode ATPG test, the captured data may be observed through a scan insertion (SI pin) of the input shared wrapper cell. The SI pin may also be referred to as a test input pin. In other words, fault propagations are observed through the SI pin. Likewise, during an ex-test mode ATPG test, the captured data may be observed through a functional input pin (D pin) of the output shared wrapper cell.

When performing an ATPG test, complex IC designs may cause potential fault detection to be blocked by wrapper cells. For example, in in-test mode, the fault activation may be successful for a component, such as a multiplexor (mux), but the fault propagation may be blocked by an internal test mode. In an ex-test mode, fault activation may not be possible as the necessary core flop may not be controllable. As a result, fault testing may not be observable in both in-test and ex-test modes, which may result in significant coverage loss due to a complexity of design of blocks within an SoC. Due to the complexity of design, logic may not be testable in either in-test mode or ex-test mode as would be appreciated by one of ordinary skill in the art having the benefit of this disclosure.

In contrast with these conventional techniques, this document describes apparatuses, systems, and methods for aspects of directional control of scan capture through shared wrapper cells. In aspects, a control circuit of an IC can program a scan flop and control the direction of a scan through a shared wrapper cell. Controlling the direction of a scan through a shared wrapper cell may enable fault activation or fault observation for logic that could not be previously tested due to the one-way nature of the in-test and ex-test modes of ATGP. For example, the control circuit may enable captured data to be observed through a D pin of an input shared wrapper cell during an in-test mode test. Likewise, the control circuit may enable captured data to be observed through an SI pin of an output shared wrapper cell during an ex-test mode test. Due to controlling the direction of scan capture, the control circuit may enable fault activation and observation for a higher portion of blocks and logic interfaces for complex designs of an SoC.

Aspects of directional control of scan capture through shared wrapper cells are disclosed. In some aspects, a control circuit of an integrated-circuit IC enables the directional control of scan captures through a shared wrapper cell. In some aspects, the control circuit receives a selection of a mode for testing the IC. Based on the selection of the mode, the control circuit configures logic of a shared wrapper cell to control a direction of a scan capture through the shared wrapper cell for the selected test mode. The scan capture for the selected test mode may be applied to the shared wrapper cell and an output of the scan capture through the shared wrapper cell may be determined for the selected test mode. By so doing, the described aspects may enable fault activation or fault observation for logic that could not be previously tested due to the one-way nature of many test modes.

An example control circuit may be used to control the direction of a scan capture through shared wrapper cells. The control circuit includes a NOT gate, an OR gate, a first AND gate, and a second AND gate. An input of the NOT gate may be coupled with a sync interface test data register (TDR). A first input of the OR gate may be coupled with an output of the NOT gate, and a second input of the OR gate may be coupled with a scan enable pin. A first input of the first AND gate may be coupled with an in-test mode TDR, and a second input of the first AND gate may be coupled with an output of the OR gate. A first input of the second AND gate may be coupled with the output of the OR gate, and a second input of the second AND gate may be coupled with an ex-test mode TDR. These and other implementations are described herein.

The directional control of scan capture through shared wrapper cells may increase the overall coverage of a SoC, or the like, that may be tested. Directional control may also may be able to eliminate coverage limiting efficiencies and enable true at-speed testing at the complex logic interface level.

Example Apparatuses, Systems, and Operational Schemes

FIG. 1 illustrates an example schematic of a control circuit 100 in which aspects for direction control of scan capture through shared wrapper cells can be implemented. A control circuit 100 may be used to control the direction of a scan capture through shared wrapper cells. In this example, the control circuit 100 includes a NOT gate 110 (or inverter) having an input 112 and an output 114. The control circuit 100 also includes an OR gate 120 having a first input 122, a second input 124, and an output 126. The first input 122 of the OR gate 120 may be coupled with the output 114 of the NOT gate 110. As shown in FIG. 1, the control circuit 100 can include a first AND gate 130 having a first input 132, a second input 134, and an output 136. The second input 134 of the first AND gate 130 may be coupled to the output 126 of the OR gate 120. The control circuit 100 includes a second AND gate 140 having a first input 142, a second input 144, and an output 146. The first input 142 of the second AND gate 140 may be coupled with the output 126 of the OR gate 120.

The control circuit 100 may be used to control the direction of a scan during an in-test mode ATGP test as discussed herein. Likewise, the control circuit 100 may be used to control the direction of a scan during an ex-test mode ATGP test. The first input 132 of the first AND gate 130 may be configured to receive an in-test mode signal via a first input node 102. The second input 144 of the second AND gate 140 may be configured to receive an ex-test mode signal via a fourth input node 108. The second input 124 of the OR gate 120 may be coupled with a scan enable pin via a third input node 106, and the input 112 of the NOT gate 110 may be configured to receive a control circuit enable signal via a second input node 104. The output 136 of the first AND gate 130 provides an output signal via a first output node 150 to an input shared wrapper cell, and the output 146 of the second AND gate 140 provides an output signal via second output node 160 to an output shared wrapper cell as discussed herein.

Figure 2:
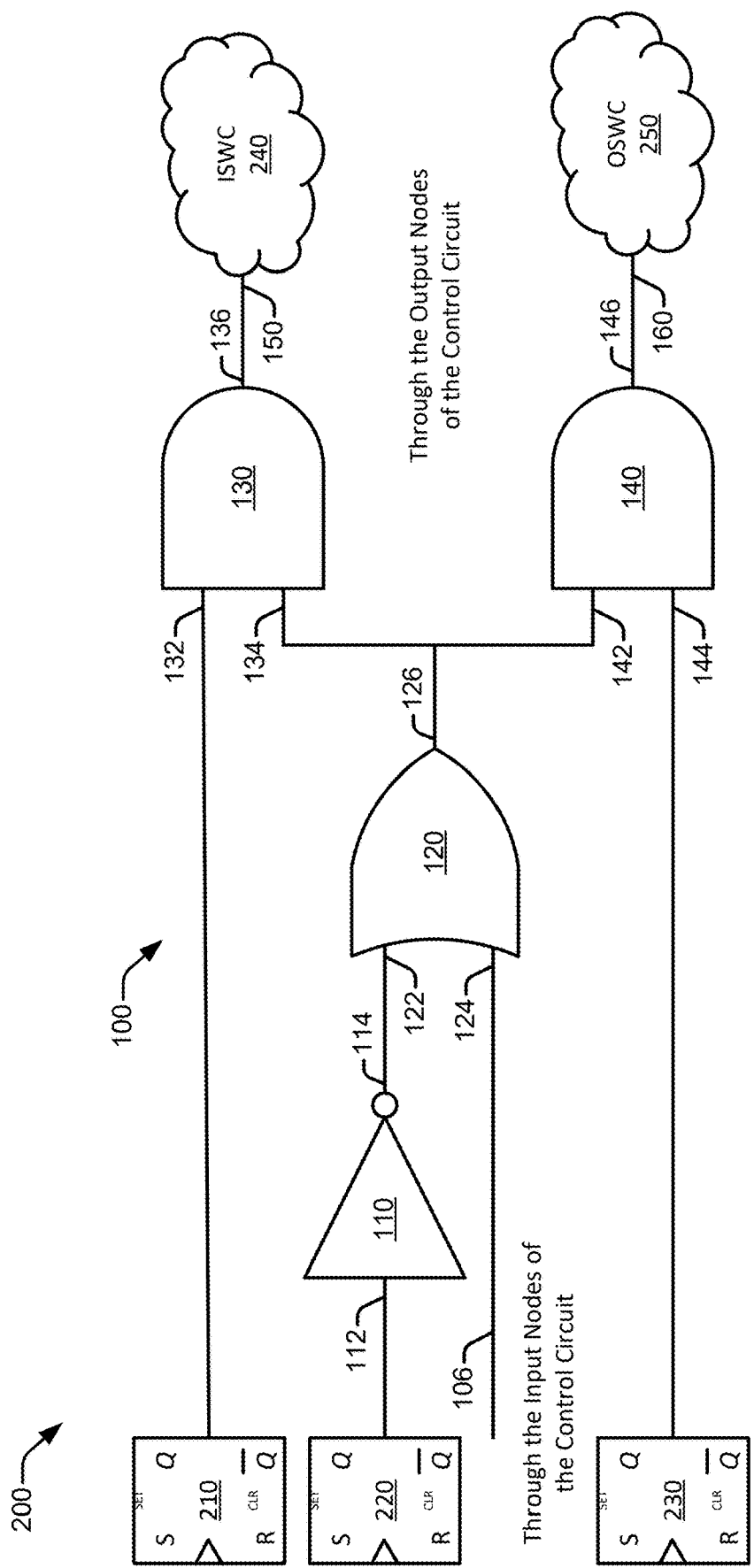
FIG. 2 illustrates an example schematic of a control circuit connected to shared wrapper cells in which aspects for direction control of scan capture through shared wrapper cells can be implemented.

FIG. 2 illustrates an example schematic of a system 200 in which aspects for direction control of scan capture through shared wrapper cells can be implemented. The system 200 includes a control circuit 100 coupled to an input shared wrapper cell 240 (ISWC 240) and an output shared wrapper cell 250 (OSWC 250). The control circuit 100 may be configured to control the direction of a scan capture during an ATPG testing of one or more blocks and logic interfaces on an SoC. The system 200 includes an in-test mode TDR 210 coupled with the first input 132 of the first AND gate 130 of the control circuit 100. The system 200 includes a sync interface TDR 220 coupled with the input 112 of the NOT gate 110, a scan enable pin coupled with the third input node 106 coupled with the second input 124 of the OR gate 120, and an ex-test mode TDR 230 coupled with the second input 144 of the second AND gate 140.

The output 136 of the first AND gate 130 may be coupled with the input shared wrapper cell 240 and the output 146 of the second AND gate 140 may be coupled with the output shared wrapper cell 250. The output signal from the first output node 150 from the output 136 of the first AND gate 130 may be sent to a scan flop circuit 300 (shown in FIG. 3) coupled between the output 136 of the first AND gate 130 and the input shared wrapper cell 240. The output signal via the second output node 160 from the output 146 of the second AND gate 140 may be sent to a scan flop circuit 400 (shown in FIG. 4) coupled between the output 146 of the second AND gate 140 and the output shared wrapper cell 250.

Figure 3:
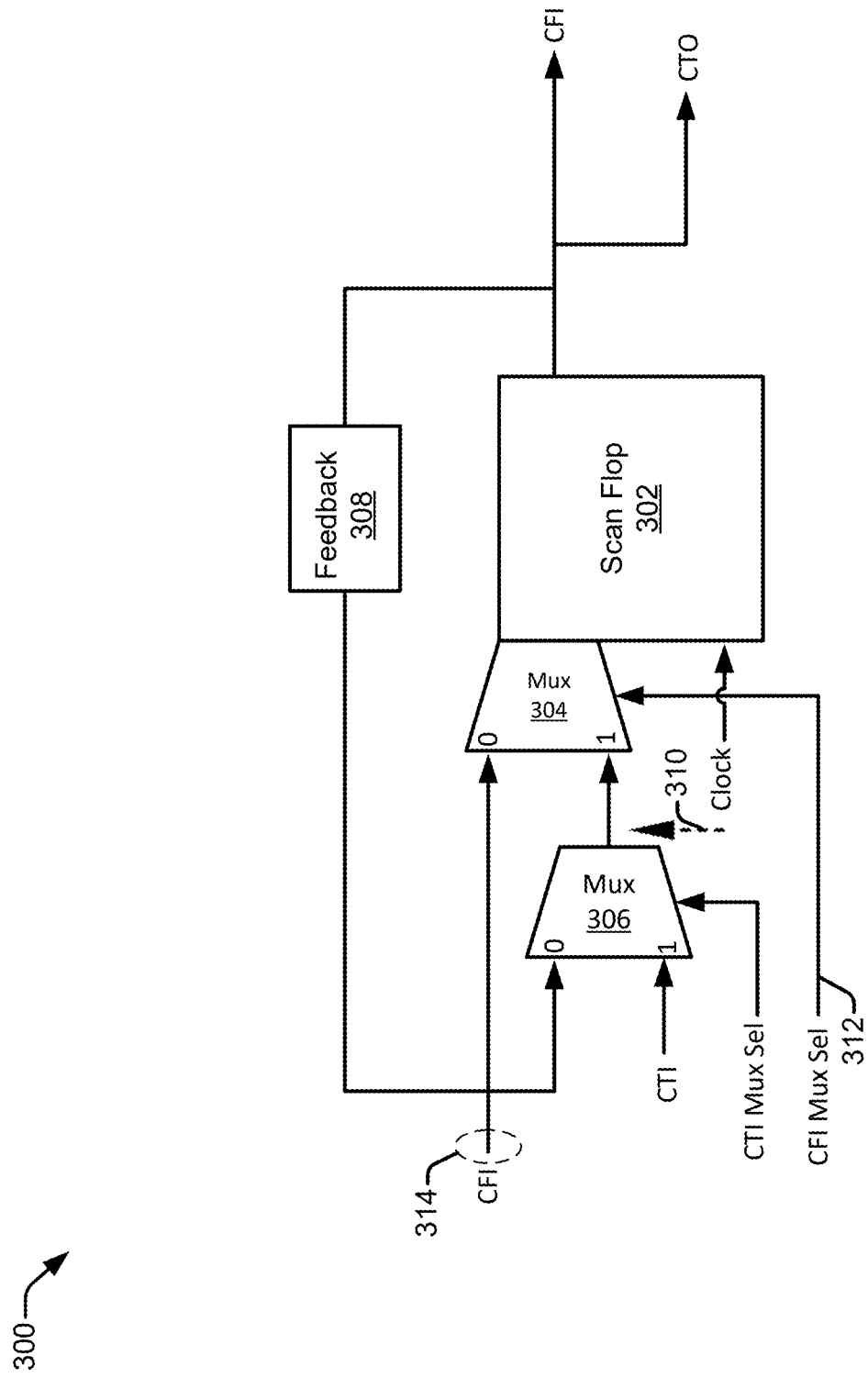
FIG. 3 illustrates an example schematic of a scan flop in which aspects for direction control of scan capture through shared wrapper cells can be implemented.

FIG. 3 illustrates an example schematic of a scan flop circuit 300 in which aspects for direction control of scan capture through shared wrapper cells can be implemented. The scan flop circuit 300 includes a scan flop 302, feedback 308, and MUXs 304, 306. The scan flop circuit 300 may be coupled with the control circuit 100 and the input shared wrapper cell 240 and enables an in-test mode of ATPG fault detection of blocks on an SoC. During in-test mode, fault propagation of a block may be observed via an SI pin indicated by an arrow 310 (in dashes). As discussed herein, the logic of the control circuit 100 enables an input of 1 to a CFI Mux Sel 312, which enables fault propagation to be observed via a D pin as indicated by an oval 314 (in dashes).

Figure 4:
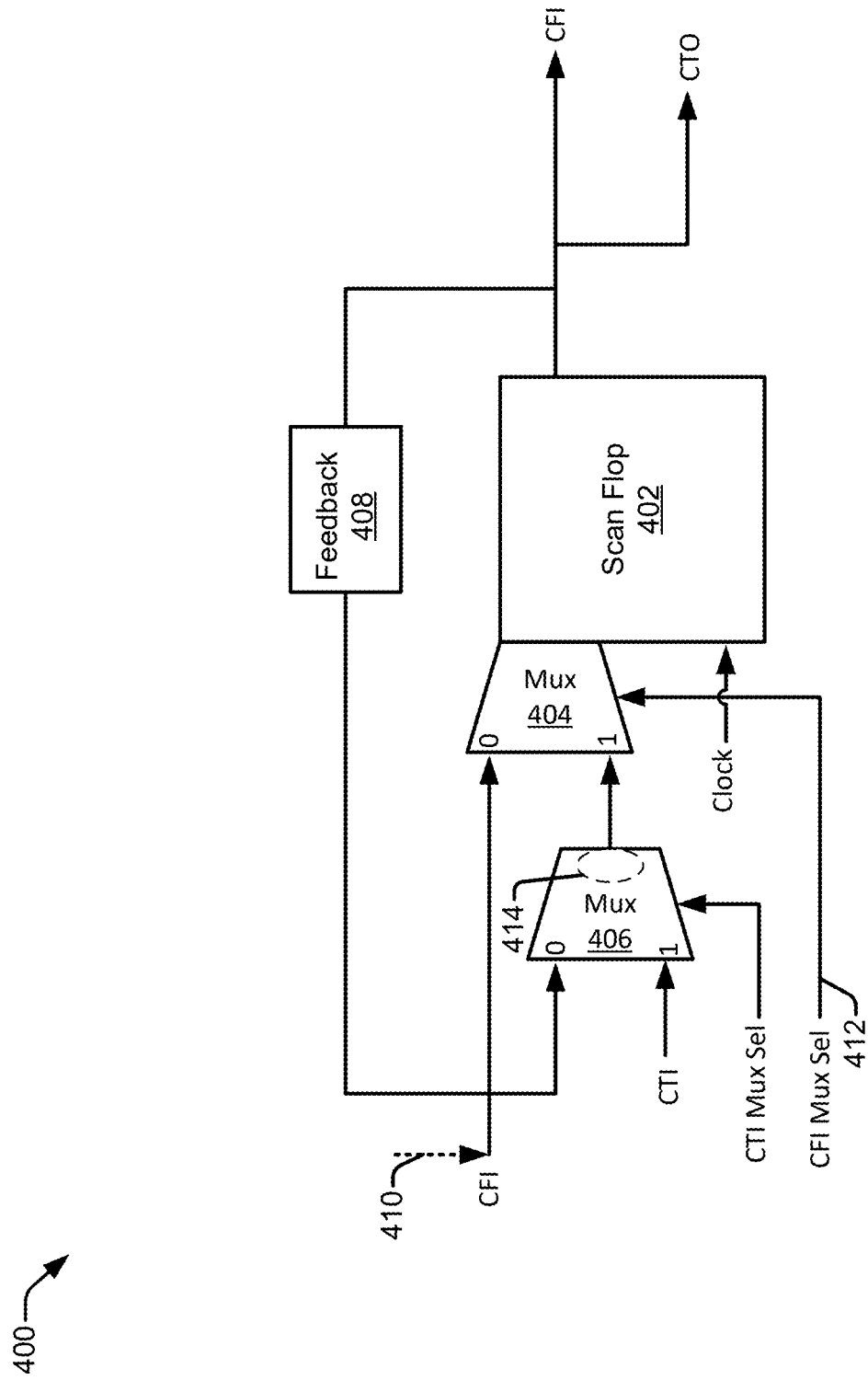
FIG. 4 illustrates an example schematic of a scan flop in which aspects for direction control of scan capture through shared wrapper cells can be implemented.

FIG. 4 illustrates an example schematic of a scan flop circuit 400 in which aspects for direction control of scan capture through shared wrapper cells can be implemented. The scan flop circuit 400 includes a scan flop 402, feedback 408, and MUXs 404, 406. The scan flop circuit 400 may be coupled with the control circuit 100 and an output shared wrapper cell 250 and enables an ex-test mode of ATPG fault detection of logic interfaces of an SoC. During ex-test mode, fault propagation of a block may be observed via D pins indicated by an arrow 410 (in dashes). As discussed herein, the logic of the control circuit 100 enables an input of 1 to a CFI Mux Sel 412, which enables fault propagation to be observed via an SI pin as indicated by an oval 414 (in dashes).

Figure 5:
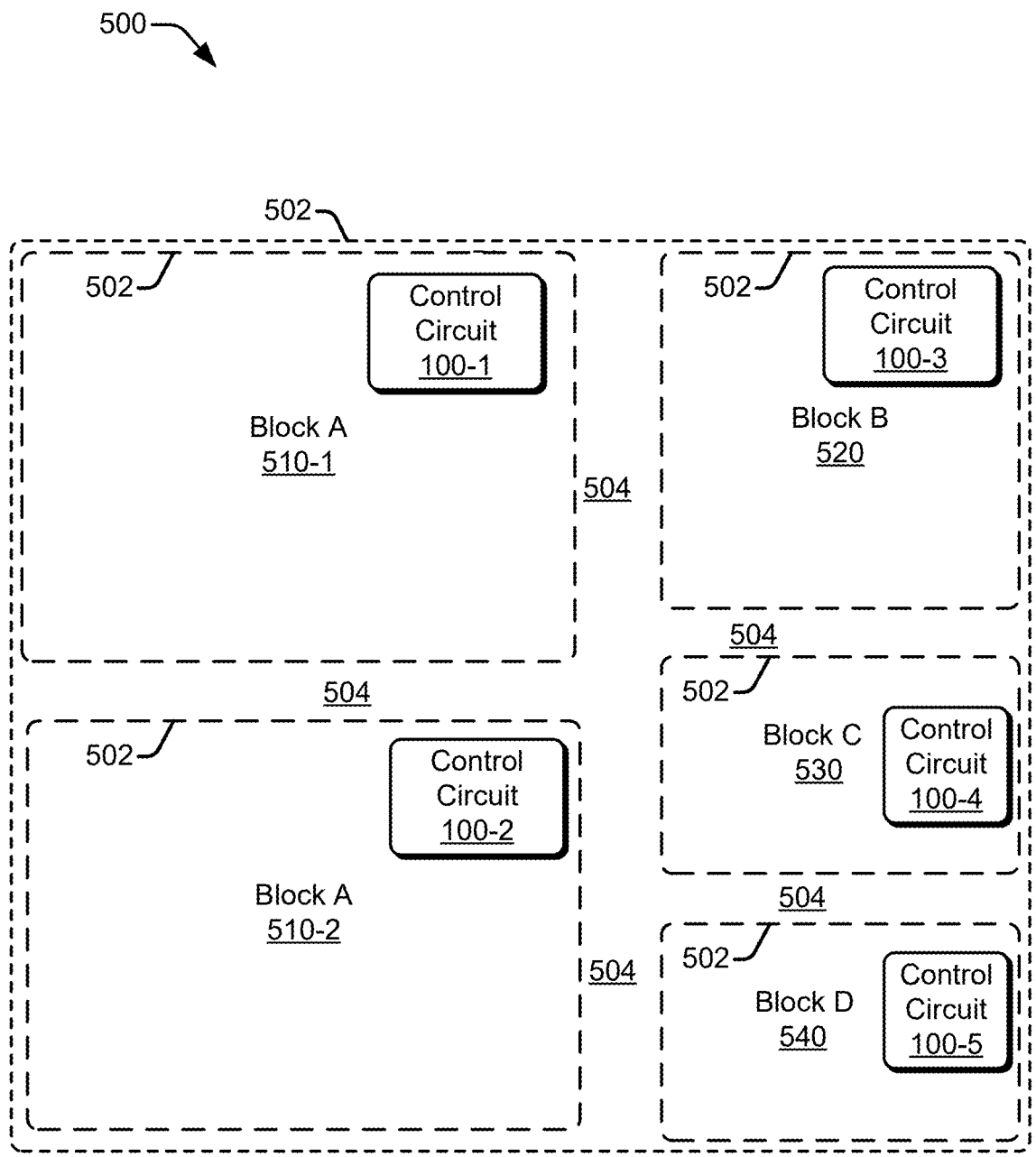
FIG. 5 illustrates an example schematic of a portion of an SoC in which aspects for direction control of scan capture through shared wrapper cells can be implemented.

FIG. 5 illustrates an example schematic of a portion of an SoC 500 in which aspects for direction control of scan capture through shared wrapper cells can be implemented. The SoC 500 includes a plurality of blocks 510-1, 510-2, 520, 530, 540. Each of the blocks 510-1, 510-2, 520, 530, 540 includes a control circuit 100-1, 100-2, 100-3, 100-4, 100-5 configured to control the direction of a scan capture during an ATPG test. The size, shape, number, and/or configuration of the blocks 510-1, 510-2, 520, 530, 540 are shown for illustrative purposes and may be varied as would be appreciated by one of ordinary skill in the art having the benefit of this disclosure.

The SoC 500 includes logic interfaces 504 between the plurality of blocks 510-1, 510-2, 520, 530, 540. A shared wrapper cell 502 may be coupled with each of the plurality of blocks 510-1, 510-2, 520, 530, 540. The shared wrapper cells 502 enable the testing of the blocks 510-1, 510-2, 520, 530, 540 as discussed herein. The in-test mode of the ATGP test may be used to detect faults within the blocks 510-1, 510-2, 520, 530, 540. The ex-test mode of the ATGP test may be used to detect faults within the logic interfaces 504 between the plurality of blocks 510-1, 510-2, 520, 530, 540.

FIG. 6 illustrates an example chart for an implementation of logic inputs for aspects of direction control of scan capture through shared wrapper cells. FIG. 6 shows a chart 600 for an implementation of logic inputs for selecting in-test mode, ex-test mode, and a control circuit mode. As indicated, each of the logic inputs may be a 1-bit wide integer value of either 0 or 1. In order to select in-test mode, the in-test mode TDR 210 provides an input of 1 to the first input 132 of the first AND gate 130, the sync interface TDR 220 provides an input of 0 to the input 112 of the NOT gate 110, and the ex-test mode TDR 230 provides an input of 0 to the second input 144 of the second AND gate 140.

In order to select ex-test mode, the in-test mode TDR 210 provides an input of 0 to the first input 132 of the first AND gate 130, the sync interface TDR 220 provides an input of 0 to the input 112 of the NOT gate 110, and the ex-test mode TDR 230 provides an input of 1 to the second input 144 of the second AND gate 140. Alternatively or additionally, in order to select control circuit mode, the in-test mode TDR 210 provides an input of 1 to the first input 132 of the first AND gate 130, the sync interface TDR 220 provides an input of 1 to the input 112 of the NOT gate 110, and the ex-test mode TDR 230 provides an input of 0 to the second input 144 of the second AND gate 140.

FIG. 7 illustrates an example chart 700 of an implementation of logic inputs for aspects of direction control of scan capture through shared wrapper cells. The chart 700 shows logic inputs for the scan capture for the three modes (in-test mode, ex-test mode, control circuit mode). For the scan capture in in-test mode, the in-test mode TDR 210 provides a 1 to the first input 132 of the first AND gate 130. The ex-test mode TDR 230 provides a 0 to the second input 144 of the second AND gate 140. The sync interface TDR 220 provides a 0 to the input 112 of the NOT gate 110, and, based on the input of 0, the output 114 of the NOT gate 110 provides a 1 to the first input 122 of the OR gate 120. The scan enable pin coupled with the third input node 106 provides a 0 to the second input 124 of the OR gate 120.

Based on the input of 1 from the NOT gate 110 and the input of 0 from the scan enable pin coupled with the third input node 106, the output 126 of the OR gate 120 provides a 1 to the second input 134 of the first AND gate 130 and a 1 to the first input 142 of the second AND gate 140. Based on the 1 input from the in-test mode TDR 210 and the 1 input from the output 126 of the OR gate 120, the output 136 of the first AND gate 130 provides a 1 input to the CFI Mux Sel 312 of the scan flop circuit 300 coupled between the control circuit 100 and the input shared wrapper cell 240. Further, based on the 1 input from the output 126 of the OR gate 120 and the 0 input from the ex-test mode TDR 230, the output 146 of the second AND gate 140 provides a 0 to the CFI Mux Sel 412 of the scan flop circuit 400 coupled between the control circuit 100 and the output shared wrapper cell 250.

For the scan capture in ex-test mode, the in-test mode TDR 210 provides a 0 to the first input 132 of the first AND gate 130. The ex-test mode TDR 230 provides a 1 to the second input 144 of the second AND gate 140. The sync interface TDR 220 provides a 0 to the input 112 of the NOT gate 110, and, based on the input of 0, the output 114 of the NOT gate 110 provides a 1 to the first input 122 of the OR gate 120. The scan enable pin coupled with the third input node 106 provides a 0 to the second input 124 of the OR gate 120.

Based on the input of 1 from the NOT gate 110 and the input of 0 from the scan enable pin coupled with the third input node 106, the output 126 of the OR gate 120 provides a 1 to the second input 134 of the first AND gate 130 and a 1 to the first input 142 of the second AND gate 140. Based on the 0 input from the in-test mode TDR 210 and the 1 input from the output 126 of the OR gate 120, the output 136 of the first AND gate 130 provides a 0 input to the CFI Mux Sel 312 of the scan flop circuit 300 coupled between the control circuit 100 and the input shared wrapper cell 240. Further, based on the 1 input from the output 126 of the OR gate 120 and the 1 input from the ex-test mode TDR 230, the output 146 of the second AND gate 140 provides a 1 to the CFI Mux Sel 412 of the scan flop circuit 400 coupled between the control circuit 100 and the output shared wrapper cell 250.

For the scan capture in control circuit mode, the in-test mode TDR 210 provides a 1 to the first input 132 of the first AND gate 130. The ex-test mode TDR 230 provides a 0 to the second input 144 of the second AND gate 140. The sync interface TDR 220 provides a 1 to the input 112 of the NOT gate 110, and, based on the input of 1, the output 114 of the NOT gate 110 provides a 0 to the first input 122 of the OR gate 120. The scan enable pin coupled with the third input node 106 provides a 0 to the second input 124 of the OR gate 120.

Based on the input of 0 from the NOT gate 110 and the input of 0 from the scan enable pin coupled with the third input node 106, the output 126 of the OR gate 120 provides a 0 to the second input 134 of the first AND gate 130 and a 0 to the first input 142 of the second AND gate 140. Based on the 1 input from the in-test mode TDR 210 and the 0 input from the output 126 of the OR gate 120, the output 136 of the first AND gate 130 provides a 0 input to the CFI Mux Sel 312 of the scan flop circuit 300 coupled between the control circuit 100 and the input shared wrapper cell 240. Further, based on the 0 input from the output 126 of the OR gate 120 and the 0 input from the ex-test mode TDR 230, the output 146 of the second AND gate 140 provides a 0 to the CFI Mux Sel 412 of the scan flop circuit 400 coupled between the control circuit 100 and the output shared wrapper cell 250.

Example Environments and Electronic Devices

Figure 8:
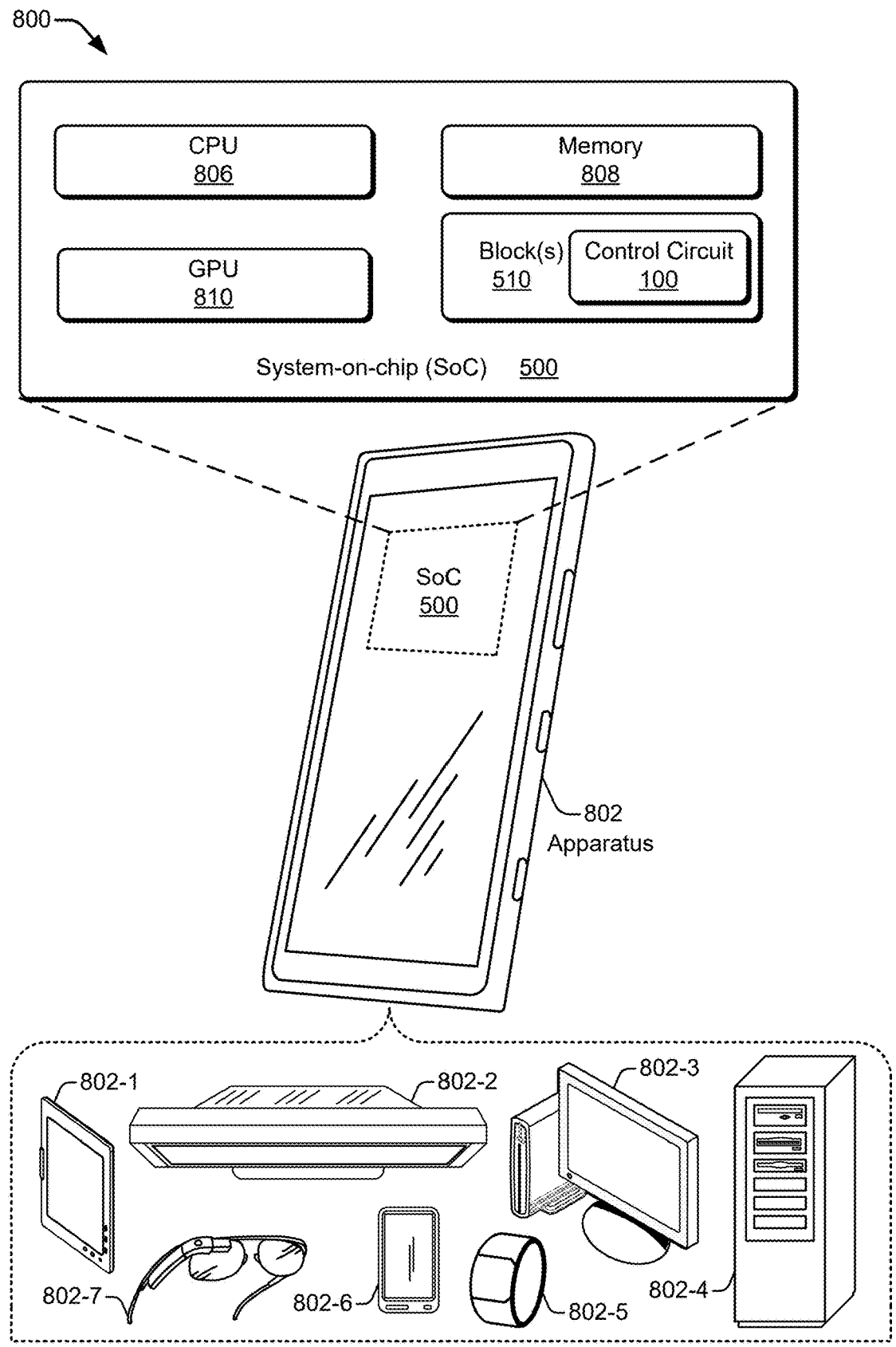
FIG. 8 illustrates an example apparatus in which aspects for direction control of scan capture through shared wrapper cells can be implemented.

FIG. 8 illustrates an example environment 800 including an apparatus 802 in which aspects for direction control of scan capture through shared wrapper cells can be implemented. The apparatus 802 may include a mobile phone, a smart phone, a smart watch, a tablet, a laptop, a mobile computer, a handheld computer, a digital assistant, or the like. The apparatus 802 includes an SoC 500, which includes at least a processor 806, memory 808, a graphics processing unit 810, and one or more blocks 510 that include a control circuit 100. The control circuit 100 may be used during ATPG testing of the SoC 500 as described herein.

In this example, the apparatus 802 is depicted as a smartphone. The apparatus 802 may, however, be implemented as any suitable computing or other electronic device. Examples of the apparatus 802 include a mobile electronic device or mobile device, mobile communication device, modem, cellular or mobile phone, mobile station, gaming device, navigation device, media or entertainment device (e.g., a media streamer or gaming controller), laptop computer, desktop computer, tablet computer, smart appliance, vehicle-based electronic system, wearable computing device (e.g., clothing, watch, or reality-altering glasses), Internet of Things (IoTs) device, sensor, stock management device, electronic portion of a machine or piece of equipment (e.g., vehicle or robot), memory storage device (e.g., a solid-state drive (SSD)), server computer or portion thereof (e.g., a server blade or rack or another part of a datacenter), and the like. Illustrated examples of the apparatus 802 include a tablet device 802-1, a smart television 802-2, a desktop computer 802-3, a server computer 802-4, a smartwatch 802-5, a smartphone (or document reader) 802-6, and intelligent glasses 802-7.

In example implementations, the apparatus 802 includes the SoC 500 that is the controller of the apparatus 802. The SoC 500 is typically a complex chip that includes a number of different components, such as processors, memory, encryption engines, and high-speed input and output lines. The SoC 500 typically comprises a single integrated circuit. The integrated circuit can be part of, or realized as, a chip, a package, a module, an assembly, or at least one printed circuit board (PCB) (not shown). Examples of a PCB include a flexible PCB, a rigid PCB, a single- or multi-layered PCB, a surface-mounted or through-hole PCB, combinations thereof, and so forth. One or more integrated circuit (IC) chips can be mounted on a PCB. Each IC chip can be realized as a general-purpose processor, a microcontroller, an application-specific IC (ASIC), and so forth. Other examples of IC chips include a security-oriented IC chip, a memory chip, a communications IC chip (e.g., a modem or radio-frequency IC), a graphics processor, an artificial intelligence (AI) accelerator, sensor chips, combinations thereof, and so forth. Sensor chips may include, for example, an accelerometer, a camera or other light sensor, a satellite positioning system (e.g., a Global Positioning System (GPS)) chip, and the like. An integrated circuit chip can be packaged alone or together with other IC chips. Although some of this disclosure refers to utilizing techniques in conjunction with an SoC, ICs, general-purpose processors, ASICs, microcontrollers, or the like, can also be used.

Example Methods

Figure 9:
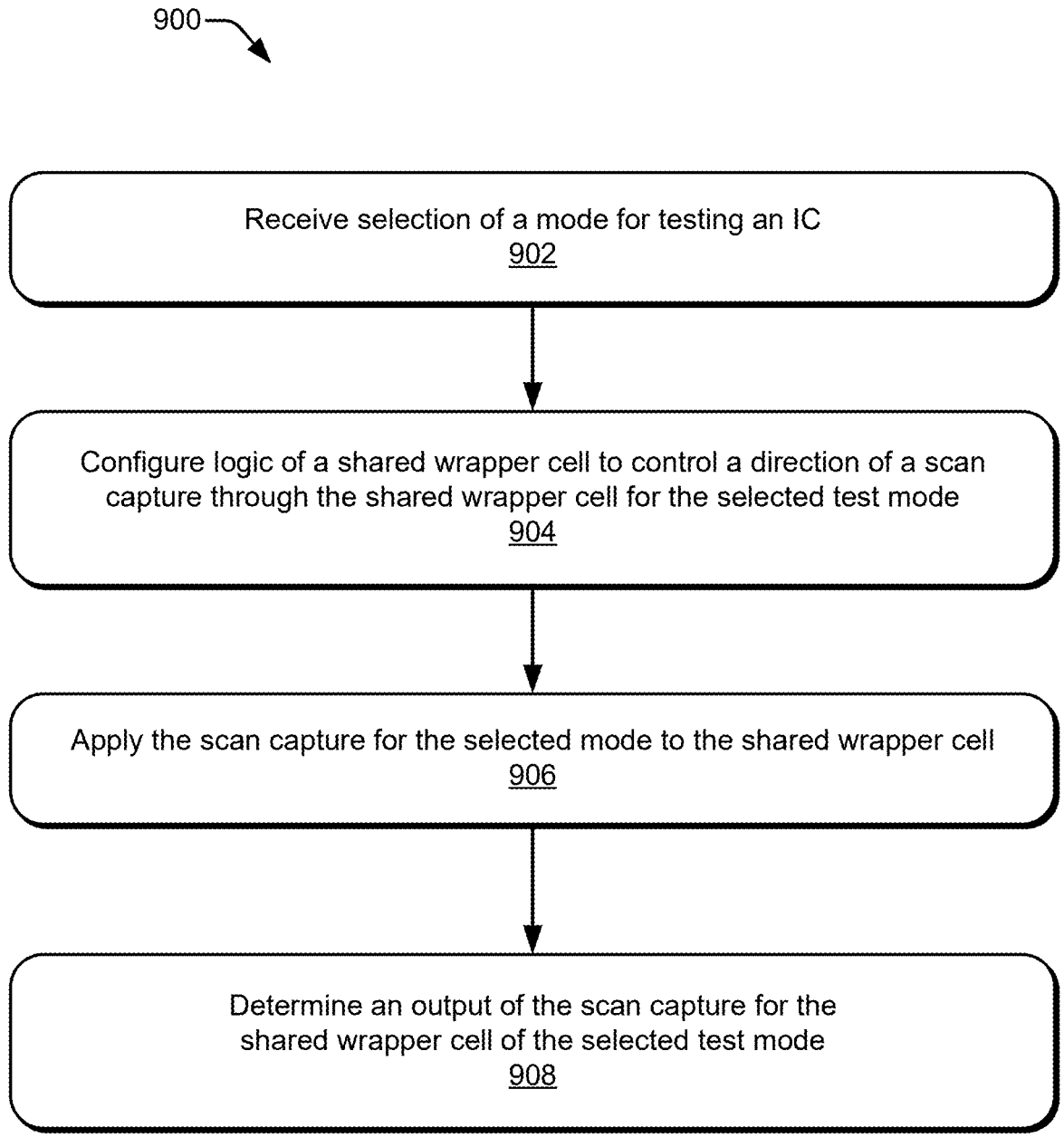
FIG. 9 illustrates an example method for directional control of scan capture through shared wrapper cells.

Example methods are described below with reference to the flow charts of FIG. 9. FIG. 9 illustrates a flow chart 900 of an example method for directional control of scan capture through shared wrapper cells. The flow chart 900 includes four blocks 902, 904, 906, 908. The operations of the example processes can be performed by electronic circuit components as described herein. For example, the operations may be performed by a control circuit 100, a scan flop circuit 300, 400, and an input shared wrapper cell 240 or an output shared wrapper cell 250.

At 902, a selection mode for testing an IC is received 902. The IC or circuitry under test may include blocks and/or interfaces of a system-on-chip. For example, an in-test mode or ex-test mode of an ATPG may be selected by inputs from an in-test mode test data register (TDR) 210, a sync interface TDR 220, a scan enable pin coupled with the third input node 106, and an ex-test mode TDR 230 as discussed herein. The received selection of the mode may select an in-test mode, an ex-test mode, or a circuit mode.

Selecting the in-test mode may include providing a bit value of 1 to the in-test mode TDR, providing a bit value of 0 to the ex-test mode TDR, and providing a bit value of 0 to the sync interface TDR. Selecting the ex-test mode may include providing a bit value of 0 to the in-test mode TDR, providing a bit value of 1 to the ex-test mode TDR, and providing a bit value of 0 to the sync interface TDR. Selecting the circuit mode may include providing a bit value of 1 to the in-test mode TDR, providing a bit value of 0 to the ex-test mode TDR, and providing a bit value of 1 to the sync interface TDR.

At 904, logic of a shared wrapper cell is configured to control a direction of a scan capture through the shared wrapper cell for the selected test mode. The scan capture may be used during an ATPG partition test mode for testing a block or logic interface on an SoC. Logic of a control circuit 100 may be used to control the direction of a scan capture through an input shared wrapper cell 240 or an output shared wrapper cell 250. The logic of the shared wrapper cell may be configured using a control circuit 100 including a plurality of logic gates. The control circuit 100 may include a NOT gate 110, an OR gate 120, a first AND gate 130, and a second AND gate 140.

An input 112 of the NOT 110 gate may be coupled to a sync interface TDR 220 configured to program the control circuit 100. A first input 122 of the OR gate 120 may be coupled to an output 114 of the NOT gate 110 and a second input 124 of the OR gate 120 may be coupled to a scan enable pin. A first input 132 of the first AND gate 130 may be coupled to an in-test mode TDR 210 and a second input 134 of the first AND gate 130 may be coupled to an output 126 of the OR gate 120. A first input 142 of the second AND gate 140 may be coupled to the output 126 of the OR gate 120 and a second input 144 of the second AND gate 140 may be coupled to an ex-test mode TDR 230.

At 906, the scan capture is applied for the selected mode to the shared wrapper cell. For example, the logic of the control circuit 100 may apply the scan capture based on inputs from an in-test mode TDR 210, a sync interface TDR 220, a scan enable pin coupled with the third input node 106, and an ex-test mode TDR 230 as discussed herein.

Applying the scan capture for the in-test mode may include providing a bit value of 1, via the output 114 of the NOT gate 110, to the first input 122 of the OR gate 120 and providing a bit value of 0, via the scan enable pin coupled to the third input node 106, to the second input 124 of the OR gate 120. Applying the scan capture for the in-test mode may include providing a bit value of 1, via the in-test mode TDR 210, to the first input 132 of the first AND gate 130 and providing a bit value of 1, via the output 126 of the OR gate 120, to the second input 134 of the first AND gate 130. Applying the scan capture for the in-test mode may include providing a bit value of 1, via the output 126 of the OR gate 120, to the first input 142 of the second AND gate 140 and providing a bit value of 0, via the ex-test mode TDR 230, to the second input 144 of the second AND gate 140 and providing a bit value of 1, via the output 136 of the first AND gate 136, to an ISWC 240, and providing a bit value of 0, via the output 146 of the second AND gate 140, to an OSWC 250.

Applying the scan capture for the ex-test mode may include providing a bit value of 0, via the output 114 of the NOT gate 110, to the first input 122 of the OR gate 120 and providing a bit value of 0, via the scan enable pin coupled to the third input node 106, to the second input 124 of the OR gate 120. Applying the scan capture for the ex-test mode may include providing a bit value of 0, via the in-test mode TDR 210, to the first input 132 of the first AND gate 130 and providing a bit value of 1, via the output 126 of the OR gate 120, to the second input 134 of the first AND gate 130. Applying the scan capture for the ex-test mode may include providing a bit value of 1, via the output 126 of the OR gate 120, to the first input 142 of the second AND gate 140 and providing a bit value of 1, via the ex-test mode TDR 230, to the second input 144 of the second AND gate 140 and providing a bit value of 0, via the output 136 of the first AND gate 136, to an ISWC 240, and providing a bit value of 1, via the output 146 of the second AND gate 140, to an OSWC 250.

Applying the scan capture for the control circuit mode may include providing a bit value of 0, via the output 114 of the NOT gate 110, to the first input 122 of the OR gate 120 and providing a bit value of 0, via the scan enable pin coupled to the third input node 106, to the second input 124 of the OR gate 120. Applying the scan capture for the control circuit mode may include providing a bit value of 1, via the in-test mode TDR 210, to the first input 132 of the first AND gate 130 and providing a bit value of 0, via the output 126 of the OR gate 120, to the second input 134 of the first AND gate 130. Applying the scan capture for the control circuit mode may include providing a bit value of 0, via the output 126 of the OR gate 120, to the first input 142 of the second AND gate 140 and providing a bit value of 0, via the ex-test mode TDR 230, to the second input 144 of the second AND gate 140 and providing a bit value of 0, via the output 136 of the first AND gate 136, to an ISWC 240, and providing a bit value of 0, via the output 146 of the second AND gate 140, to an OSWC 250.

At 908, an output of the scan capture is determined for the shared wrapper cell of the selected test mode. For example, fault propagation may be viewed via a D pin or SI pin as discussed herein.

For the methods described herein and the associated flow chart(s) and flow diagram(s), the orders in which operations are shown and/or described are not intended to be construed as a limitation. Instead, any number or combination of the described method operations can be combined in any order to implement a given method or an alternative method, including by combining operations from the flow chart or diagram and the earlier-described schemes and techniques into one or more methods. Operations may also be omitted from or added to the described methods. Further, described operations can be implemented in fully or partially overlapping manners.

CONCLUSION

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

Although implementations for directional control of scan capture through shared wrapper cells have been described in language specific to certain features and/or methods, the subject of the appended claims is not necessarily limited to the specific features or methods described. Rather, the specific features and methods are disclosed as example implementations for directional control of scan capture through shared wrapper cells.

What is claimed is:

1. An integrated circuit (IC) for directional control of scan capture through shared wrapper cells comprising:
   a first input node coupled with an in-test mode test data register (TDR);
   a second input node coupled with a sync interface TDR;
   a third input node coupled with a scan enable pin;
   a fourth input node coupled with an ex-test mode TDR;
   a first output node with an input shared wrapper cell;
   a second output node coupled with an output shared wrapper cell;
   a control circuit comprising:
      a NOT gate having an input and an output, the input coupled with the sync interface TDR via the second input node;
      an OR gate having a first input, a second input, and an output, the first input coupled with the output of the NOT gate and the second input coupled with the scan enable pin via the third input node;
      a first AND gate having a first input, a second input, and an output, the first input of the first AND gate coupled with the in-test mode TDR via the first input node, the second input of the first AND gate coupled with the output of the OR gate, and the output of the first AND gate coupled with the input shared wrapper cell via the first output node; and
      a second AND gate having a first input, a second input, and an output, the first input of the second AND gate coupled with the output of the OR gate and the second input of the second AND gate coupled with the ex-test mode TDR via the fourth input node, and the output of the second AND gate coupled with the output shared wrapper cell via the second output node.

2. The IC of claim 1, wherein the sync interface TDR is coupled to a test control interface and a mode of the control circuit is configured based on a state of the sync interface TDR.

3. The IC of claim 2, wherein logic within a block of the plurality of blocks may be tested in an in-test mode.

4. The IC of claim 3, wherein in in-test mode the control circuit enables a result of a test to be observable at a D pin of the input shared wrapper cell.

5. The IC of claim 2, wherein logic within an interface between two blocks of the plurality of blocks may be tested in an ex-test mode.

6. The IC of claim 5, wherein in ex-test mode the control circuit enables a result of a test to be observable at an SI pin of the output shared wrapper cell.

7. A system for an automatic test pattern generation partition test mode for testing a plurality of blocks and logic interfaces on a system-on-chip (SoC) comprising:
   a first block of an SOC;
   a first shared wrapper operably coupled with the first block, the first shared wrapper including a first input shared wrapper cell and a first output shared wrapper cell; and
   a first control circuit within the first block, the first control circuit comprising:
      a first NOT gate having an input and an output, the input coupled with a first sync interface test data register (TDR);
      a first OR gate having a first input, a second input, and an output, the first input coupled with the output of the first NOT gate and the second input coupled with a first scan enable pin;
      a first AND gate having a first input, a second input, and an output, the first input of the first AND gate coupled with a first in-test mode TDR and the second input of the first AND gate coupled with the output of the first OR gate; and
      a second AND gate having a first input, a second input, and an output, the first input of the second AND gate coupled with the output of the first OR gate and the second input of the second AND gate coupled with a first ex-test mode TDR.

8. The system of claim 7, wherein the first control circuit is configured to control a first direction of the first input shared wrapper cell and a second direction of the first output shared wrapper cell during a scan capture.

9. The system of claim 8, comprising:
   a second block of the SoC;
   a second shared wrapper around the second block, the second shared wrapper including a second input shared wrapper cell and a second output shared wrapper cell; and
   a second control circuit within the second block, the second control circuit comprising:
      a second NOT gate having an input and an output, the input coupled with a second sync interface TDR;
      a second OR gate having a first input, a second input, and an output, the first input coupled with the output of the second NOT gate and the second input coupled with a second scan enable pin;
      a third AND gate having a first input, a second input, and an output, the first input of the third AND gate coupled with a second in-test mode TDR and the second input of the third AND gate coupled with the output of the second OR gate; and
      a fourth AND gate having a first input, a second input, and an output, the first input of the fourth AND gate coupled with the output of the second OR gate and the second input of the fourth AND gate coupled with a second ex-test mode TDR.

10. The system of claim 9, further comprising:
   logic positioned within an interface between the first block and the second block, wherein the logic may be tested during an ex-test mode and logic within the first and second blocks may be tested during an in-test mode.

11. The system of claim 10, wherein in in-test mode the first and second control circuits enable results of a test to be observable at D pins of the first and second input shared wrapper cells and wherein in ex-test mode the first and second control circuits enable results of a test to be observable at SI pins of the first and second output shared wrapper cells.

12. A method for testing an integrated circuit (IC), the method comprising:
   receiving selection of a test mode for testing the IC;

configuring logic of a shared wrapper cell to control a direction of a scan capture through the shared wrapper cell for the selected test mode;

applying the scan capture for the selected test mode to the shared wrapper cell; and determining an output of the scan capture for the shared wrapper cell of the selected test mode;

wherein the logic of the shared wrapper cell is configured using a control circuit, the control circuit comprising:

a NOT gate, an input of the NOT gate being coupled to a sync interface test data register (TDR);

an OR gate, a first input of the OR gate being coupled to an output of the NOT gate and a second input of the OR gate being coupled to a scan enable pin;

a first AND gate, a first input of the first AND gate being coupled to an in-test mode TDR and a second input of the first AND gate being coupled to an output of the OR gate; and a second AND gate, a first input of the second AND gate being coupled to the output of the OR gate and a second input of the second AND gate being coupled to an ex-test mode TDR.

13. The method of claim 12, wherein the received selection of the mode comprises selecting an in-test mode, an ex-test mode, or a circuit mode.

14. The method of claim 13, wherein selecting the in-test mode comprises:
providing a bit value of 1 to the in-test mode TDR;
providing a bit value of 0 to the ex-test mode TDR; and
providing a bit value of 0 to the sync interface TDR.

15. The method of claim 14, wherein applying the scan capture further comprises:
providing a bit value of 1, via the output of the NOT gate, to the first input of the OR gate;
providing a bit value of 0, via the scan enable pin, to the second input of the OR gate;
providing a bit value of 1, via the in-test mode TDR, to the first input of the first AND gate and providing a bit value of 1, via the output of the OR gate, to the second input of the first AND gate;
providing a bit value of 1, via the output of the OR gate, to the first input of the second AND gate and providing a bit value of 0, via the ex-test mode TDR, to the second input of the second AND gate;
providing a bit value of 1, via the output of the first AND gate, to an input shared wrapper cell; and
providing a bit value of 0, via the output of the second AND gate, to an output shared wrapper cell.

16. The method of claim 13, wherein selecting the ex-test mode comprises:
providing a bit value of 0 to the in-test mode TDR;
providing a bit value of 1 to the ex-test mode TDR; and
providing a bit value of 0 to the sync interface TDR.

17. The method of claim 16, wherein applying the scan capture further comprises:
providing a bit value of 1, via the output of the NOT gate, to the first input of the OR gate;
providing a bit value of 0, via the scan enable pin, to the second input of the OR gate;
providing a bit value of 0, via the in-test mode TDR, to the first input of the first AND gate and providing a bit value of 1, via the output of the OR gate, to the second input of the first AND gate;
providing a bit value of 1, via the output of the OR gate, to the first input of the second AND gate and providing a bit value of 1, via the ex-test mode TDR, to the second input of the second AND gate;
providing a bit value of 0, via the output of the first AND gate, to an input shared wrapper cell; and
providing a bit value of 1, via the output of the second AND gate, to an output shared wrapper cell.

18. The method of claim 13, wherein selecting the circuit mode comprises:
providing a bit value of 1 to the in-test mode TDR;
providing a bit value of 0 to the ex-test mode TDR; and
providing a bit value of 1 to the sync interface TDR.

19. The method of claim 18, wherein applying the scan capture further comprises:
providing a bit value of 0, via the output of the NOT gate, to the first input of the OR gate;
providing a bit value of 0, via the scan enable pin, to the second input of the OR gate;
providing a bit value of 1, via the in-test mode TDR, to the first input of the first AND gate and providing a bit value of 0, via the output of the OR gate, to the second input of the first AND gate;
providing a bit value of 0, via the output of the OR gate, to the first input of the second AND gate and providing a bit value of 0, via the ex-test mode TDR, to the second input of the second AND gate;
providing a bit value of 0, via the output of the first AND gate, to an input shared wrapper cell; and
providing a bit value of 0, via the output of the second AND gate, to an output shared wrapper cell.

* * * * *